(12) United States Patent
Kling et al.

(10) Patent No.: US 8,146,538 B2
(45) Date of Patent: Apr. 3, 2012

(54) AIRBORNE INTERACTIVE CAT TREAT OR TOY

(75) Inventors: Jay Kling, Westminster, CA (US); Tracy Grammer, Long Beach, CA (US); Eric Lew, Los Angeles, CA (US); Don Barnvos, Huntington Beach, CA (US); Tracy Wojnarowski, Long Beach, CA (US)

(73) Assignee: Del Monte Corporation, San Francisco, CA (US)

(*) Notice: Subject to any disclaimer, the term of this patent is extended or adjusted under 35 U.S.C. 154(b) by 1162 days.

(21) Appl. No.: 11/606,905

(22) Filed: Dec. 1, 2006

(65) Prior Publication Data

US 2008/0127904 A1 Jun. 5, 2008

(51) Int. Cl.
*A01K 29/00* (2006.01)

(52) U.S. Cl. ........................................ 119/710; 119/702

(58) Field of Classification Search .................. 119/710, 119/709, 711; 446/34, 46
See application file for complete search history.

(56) References Cited

U.S. PATENT DOCUMENTS

| | | | | |
|---|---|---|---|---|
| 4,557,219 A * | 12/1985 | Edwards | ......................... | 425/472 |
| 4,919,083 A * | 4/1990 | Axelrod | ......................... | 119/710 |
| 5,265,559 A * | 11/1993 | Borell | ......................... | 119/707 |
| 5,352,148 A * | 10/1994 | Watkins | ......................... | 446/475 |
| 5,507,680 A * | 4/1996 | Watkins | ......................... | 446/475 |
| 5,553,570 A * | 9/1996 | VanNatter et al. | ............. | 119/709 |
| 5,643,042 A * | 7/1997 | Watkins | ......................... | 446/475 |
| 6,050,871 A * | 4/2000 | Chen | ......................... | 446/46 |
| 6,360,693 B1 * | 3/2002 | Long, III | ......................... | 119/707 |
| 6,918,809 B2 * | 7/2005 | Persall | ......................... | 446/46 |
| 7,147,888 B2 * | 12/2006 | Brown et al. | ......................... | 426/89 |
| 2005/0226971 A1* | 10/2005 | Schuppan et al. | ............. | 426/289 |
| 2007/0006818 A1* | 1/2007 | Bidinger | ......................... | 119/709 |
| 2007/0110681 A1* | 5/2007 | Hill et al. | ......................... | 424/49 |
| 2009/0253338 A1* | 10/2009 | Wilson | ......................... | 446/46 |

OTHER PUBLICATIONS

A. Belmonte et al., "From Flutter to Tumble: Inertial Drag and Froude Similarity in Falling Paper," 81 *Physical Review Letters* (No. 2), 345, Jul. 13, 1998.
T. Neil Davis, "Falling Snowflakes," Article #454, Alaska Science Forum, Apr. 19, 1981.
Xiaoming Wei, Ye Zhao, Zhe Fan, Wei Li, Feng Qui, Suzanne Yoakum-Stover, and Arie Kaufman, *Fellow, IEEE*, "Lattice-Based Flow Field Modeling".
Andrew Belmonte, "Flutter and Tumble in Fluids," Physics World— Physics Web (Apr. 1999).
Veeraraghavan Seshadri, Rajat Mittal, H.S. Udavkumar, "Vortex Induced Auto-Rotation of a Hinged Plate: A computational Study," Proceedings of ASME FEDSM2003-45512, 4th ASME-JSME Joint Fluids Engineering Conference, Honolulu, Hawaii, USA, Jul. 6-10, 2003.
Andrew Belmonte, Hagai Eisenberg, and Elisha Moses, "Flutter and Tumble: The Physics of Falling Paper," Physics News Graphics: General Physics, Jun. 18, 1998.
Umberto Pesavento "Unsteady Aerodynamics of Falling Plates," A Dissertation Presented to the Faculty of the Graduate School of Cornell University in Partial Fulfillment of the Requirements for the Degree of Doctor of Philosophy, Jan. 2006.
X. Wei, Y. Zhao, Z. Fan, W. Li, Feng Qui, S. Yoakum-Stover, and A. Kaufman; "Lattice-Based Flow Field Modeling"; *IEEE Transactions on Visualization and Computer Graphics*, 10(6): 719-29 (Nov. 2004).

* cited by examiner

*Primary Examiner* — Yvonne R. Abbott
(74) *Attorney, Agent, or Firm* — Buchanan Ingersoll & Rooney PC

(57) ABSTRACT

An aerodynamically interactive artifact is proportioned to experience at least one of tumbling, fluttering, and autorotating motion when subjected to free fall in a gravitational field. Suitable shapes include films, strips, butterflies, birds, and the like. The artifact may be contain a nutraceutical, may be dissolvable in pet saliva, and may provide an olfactory sensation for a pet. Dimensionless parameters such as Froude number and length-to-thickness ratios may be used to select aerodynamically interactive motions.

25 Claims, 3 Drawing Sheets

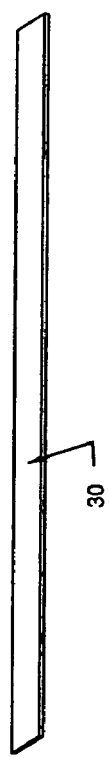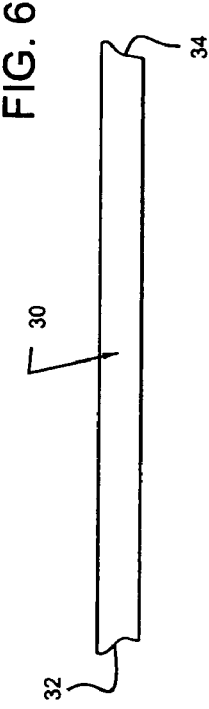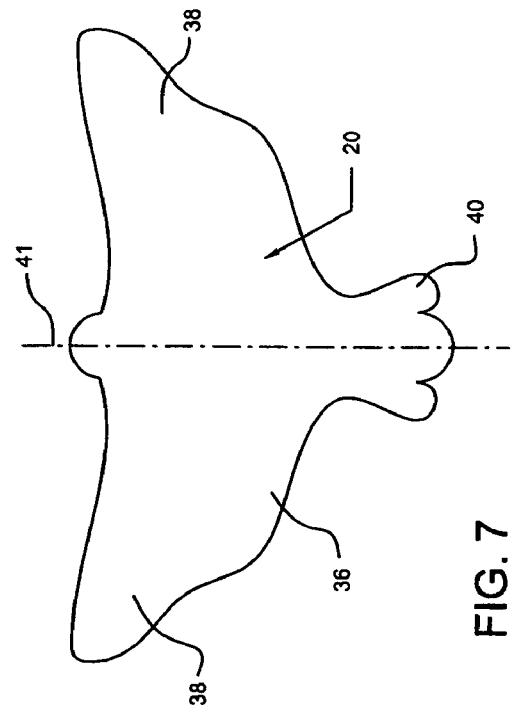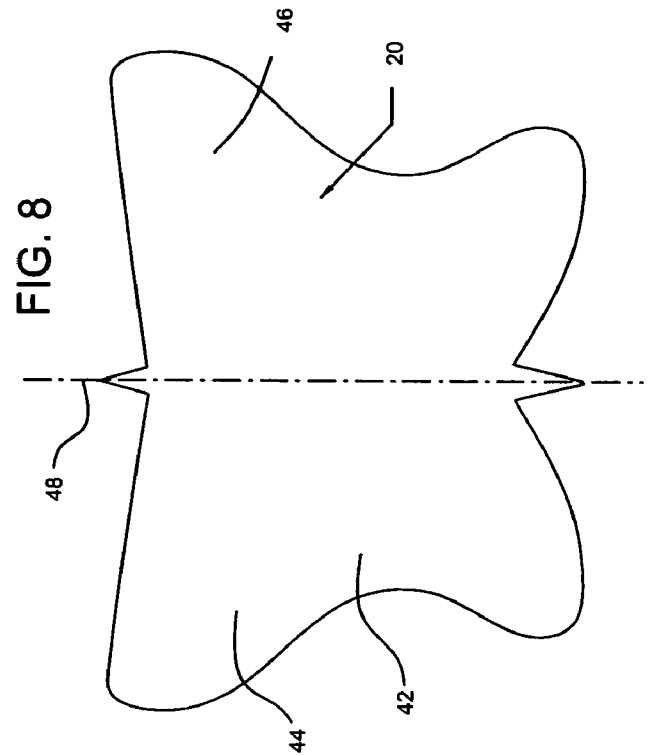

AIRBORNE INTERACTIVE CAT TREAT OR TOY

BACKGROUND OF THE INVENTION

The present invention relates broadly to pet treats. More particularly, the invention concerns airborne treats for interaction between a cat and a person and a method of such interaction.

SUMMARY OF THE INVENTION

An artifact adapted for enhancement of human/feline interaction may comprise an article having a major dimension, a minor dimension, and a thickness, where the minor dimension is less than the major dimension and the thickness is substantially less than the major dimension such that the article is aerodynamically interactive when moving through air under the influence of gravitational forces. That aerodynamic interactivity may give rise to erratic movement and may include one or more or fluttering motion, tumbling motion, and autorotation motion. Ordinarily, the article may be characterized as film-like to reflect its thin sheet appearance.

Typically, the article includes a substrate that may or may not be coated. The substrate may have any of various configuration including, without limitation, a generally rectangular shape, a thin narrow strip, a bird, a butterfly, or a seed. The substrate may be edible, and may even be soluble in cat saliva if desired. One or more conventional palatant, flavorant, and/or nutraceutical may be incorporated in the substrate, as may be desired.

Where a coating is applied to the substrate, the coating may also include one or more conventional palatants, flavorants, and/or nutraceuticals, again as may be desired. In some embodiments, a nutraceutical may be added to the substrate by the consumer to tailor the artifact as a nutraceutical delivery system.

Where a particular type of aerodynamic interaction is desired, the article can be constructed and arranged to provide tumbling, or fluttering, or autorotating motion.

To use the artifact as a toy, a treat, or a nutraceutical delivery system, the caregiver provides the artifact constructed and arranged to interact with air and exhibit the desired erratic motion. The caregiver drops or otherwise releases the artifact in proximity to the feline pet from a height sufficient for the artifact to exhibit the desired erratic motion. As the artifact falls under the influence of gravity, the feline pet is allowed to chase and catch the artifact—and eat it where it is a treat or nutraceutical.

BRIEF DESCRIPTION OF THE DRAWINGS

Many objects and advantages of the present invention will be apparent to those skilled in the art when this specification is read in conjunction with the attached drawings where like reference numerals have been applied to like elements and wherein:

FIG. 5 is an isometric view of an artifact according to a fifth embodiment of the invention;

FIG. 6 is a plan view of an artifact according to a sixth embodiment of the invention;

FIG. 7 is a plan view of an artifact according to a seventh embodiment of the invention;

FIG. 8 is a plan view of an artifact according to a eighth embodiment of the invention;

DESCRIPTION OF THE PREFERRED EMBODIMENTS

Interaction between a pet owner and a pet provides benefits for both. The pet enjoys a one-on-one experience with its owner, an experience that promotes bonding between the pet and its owner or caregiver. Simultaneously, the owner/caregiver has an opportunity to be amused by the pet, and may use the opportunity to give the pet a treat, or a nutraceutical. This interaction may be effected through use of a toy designed to promote the interaction, or a treat designed to provide a pleasant sensory sensation for the pet. Where the pet is a feline, i.e., a cat or kitten, that interaction can be promoted and capitalized upon by recognizing that felines are typically intrigued by movement, especially erratic movement.

The present invention builds upon that concept—erratic motion—by using the aerodynamic interaction between a light, falling object and atmospheric air to create an airborne artifact. When a light object, such as a feather, falls through air under the influence of a gravitational field, the object may experience one or more kinds of erratic motion. More particularly, the object may flutter downwardly. Fluttering is exemplified by side-to-side gyrations in two or three dimensions as the object falls. An object might also experience tumbling movement as it falls. Tumbling is exemplified by rotational movement about an axis that is generally transverse to the direction the object is falling. An object might also experience an autorotation movement as it falls. Autorotation is exemplified by rotational movement about an axis that is generally aligned to the direction through which the object is falling. In most situations, as an object falls it undergoes a combination of such movements: fluttering, tumbling, and/or autorotation.

Figure 1:
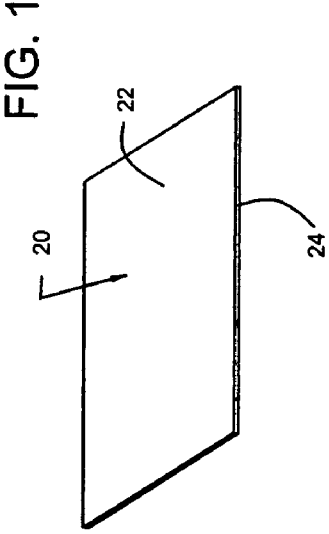
FIG. 1 is an isometric view of an artifact according to the invention.

This invention employs those various airborne movements of an object falling through a gravitational field to design an artifact that enhances interaction between a pet and its owner/caregiver. Turning now to FIG. 1, an elementary embodiment of the artifact 20 is shown. The artifact 20 may be fashioned from thin sheet material. The material may have a generally uniform thickness less than about 0.010 in. Preferably, the material may have a thickness of less than about 0.005 in. More preferably, the material may have a thickness of less than about 0.003 in.—about the thickness of a sheet of paper.

The artifact 20 normally has a major dimension measured between the extremities in its largest direction. In addition, the artifact normally has a minor dimension measured between the extremities in a direction transverse to the major dimension. Ordinarily, the minor dimension is less than the major dimension. As seen in FIG. 1, the artifact 20 may be a generally planar film-like sheet having a thickness which is substantially smaller than both the major dimension and the minor dimension. For purposes of this discussion, "substantially smaller" means that the ratio of the minor dimension to the thickness is 15 or greater.

Depending upon the intended use, the artifact 20 may be fabricated from different materials. For example, where the artifact 20 will be used as a cat toy, the artifact 20 may be fashioned from paper; an edible film; a wafer-like edible material, a thin, non-toxic sheet material; or the like. Where the artifact 20 will be used as a treat or a nutraceutical delivery system, the artifact 20 may be fashioned from an edible film; a thin, non-toxic sheet material; or the like. When used as a treat or nutraceutical delivery system, a coating 22 may be applied to a substrate 24 of the artifact 20. The coating 22 may provide an scent or smell attractive to the cat and/or a taste found pleasing to cats. To this end, the coating 22 may comprise any compound or combination of ingredients that result in a coating having one or more of an attractive taste, smell, and/or scent. Moreover, when used as a treat or nutraceutical delivery system, the artifact 20 itself may be fabricated from a material containing one or more compounds or ingredients having an attractive taste, smell, and/or scent. Without intending to limit the generality of such compounds or ingredients, exemplary taste, smell, and/or scent compounds or ingredients may include one or more of catnip, fish, chicken, shrimp, seafood and/or poultry odor or taste generators.

Where the artifact 20 is used as a nutraceutical delivery system, the nutraceutical may be incorporated into the substrate of the artifact 20, or incorporated into the coating 22, or both. Plainly, in some applications it may be desired to incorporate the nutraceutical in the substrate while a masking scent or smell is applied in coating to disguise the nutraceutical. If the nutraceutical is a granular material, it may also be applied in the coating 22 with a suitable food-grade binder to hold the granular material to the substrate of the artifact 20.

Figure 2:
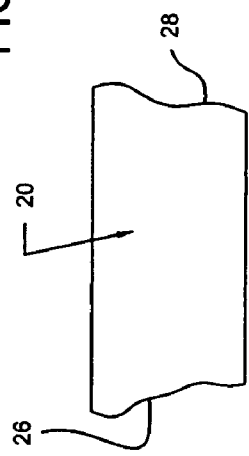
FIG. 2 is a plan view of an artifact according to a second embodiment of the invention.
Figure 4:
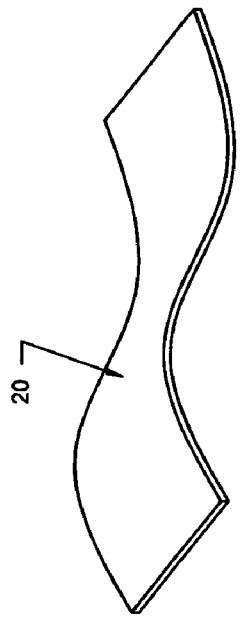
FIG. 4 is an isometric view of an artifact according to a forth embodiment of the invention having a wavy shape.
Figure 3:
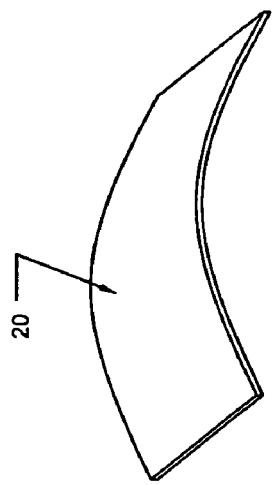
FIG. 3 is an isometric view of an artifact according to a third embodiment of the invention having a curved shape.

Although the artifact 20 depicted in FIG. 1 is substantially rectangular in shape, it is not required that the artifact 20 have such a specific configuration. More particularly, the artifact 20 may include edges 26, 26 (see FIG. 2) which are irregular, which meet adjacent edges with sharp corners or rounded corners, and/or which are dissimilar to one another. Furthermore, although the artifact 20 has been illustrated for convenience as a planar object (FIG. 1), it may be desired that a more complex shape such as curved plate (see FIG. 3), a wavy plate (see FIG. 4), or other more complex shapes may be employed. Such nonplanar shapes may be capable of generating even more interesting aerodynamic interactions as the artifact drops though air.

In the embodiments of FIGS. 1-4, the major dimensions have the same order of magnitude as the minor dimension, that is the ratio of the major dimension to the minor dimension for the artifact 20 is less than about 5. However, as illustrated in FIGS. 5 and 6, the artifact may comprise a long strip 30 for which the ratio of the major dimension to the minor dimension is greater than about 5. As with the embodiments of FIGS. 1-4, the long strip 30 may be coated, may have irregular edges 32, 34 (see FIG. 6), and may be flat, curved, or wavy, and may be constructed from the same materials and compounds described above.

While the artifact 20 may have two or more generally parallel edges, as shown in FIGS. 1-6, the artifact 20 may have an irregular shape if desired. For example (see FIG. 7), a bird-shaped design 36 may be used for the external contour of the artifact 20. The design 36 may include a pair of opposed, elongated wings 38 and a tail 40. The design 36 may be symmetric about an axis 41 positioned between the wings 38. Alternatively, the design 36 may be asymmetric to generate even more complex airborne movements.

The artifact 20 may also have an irregular shape resembling a butterfly 42 (see FIG. 8). In this embodiment, a pair of wings 44, 46 are generally symmetric about an axis 48 extending between them.

Another embodiment of the artifact 20 (see FIG. 9) resembles a single wing 50 and is also an irregular configuration. The wing 50 may include a bulbous portion 52 at one end. The wing 50 also has a leading edge 54 and a trailing edge 56. If desired, some curvature may be provided between the leading and trailing edges 54, 56 so that the wing-like portion of this embodiment 50 is nonplanar. The bulbous portion 52 may define a pocket suitable to receive a morsel of food, a treat, or a nutraceutical. The morsel, treat, or nutraceutical may be supplied with the artifact 20, or the artifact 20 may be supplied with an empty pocket that may be filled by the purchaser with a nutraceutical or treat or the purchaser's own selection to tailor the product to observed likes and dislikes of the particular cat. The wing-shaped artifact 20 may exhibit an autorotation movement when allowed to fall through air in a gravitational field.

It should be noted that any of the embodiments illustrated in FIGS. 1-9 may have a substrate with the characteristics described above. Likewise, it should be noted that any of the embodiments illustrated may have one or more coatings with the characteristics described above.

Turning now to the motion of the artifact, as described above fluttering can be described as side-to-side gyrations in two or three dimensions as an object falls. Tumbling can be described as rotational movement about an axis where the axis is generally transverse to the direction through which the object falls. Autorotation can be described as rotational movement about an axis where the axis is generally aligned with the direction through which the object falls. The physical characteristics of the artifact which differentiate between fluttering and tumbling motion are not well understood for light artifacts moving in three dimensions falling through air. While not desiring to be bound by any particular analysis in a scientific area that is not well understood, it has been reported in the scientific literature that the transition between tumbling and fluttering in quasi-two-dimensional flows occurs for a Froude number, $F_r$, of about 0.67. See, A. Belmonte et al., "From Flutter to Tumble: Inertial Drag and Froude Similarity in Falling Paper", 81 PHYSICAL REVIEW LETTERS (No. 2), 345 (Jul. 13, 1998). The Froude number is a dimensionless number typically used as a parameter representative of certain similarities between seemingly different fluid flow systems. The Froude number can be expressed as follows:

$$Fr = \sqrt{\frac{2\gamma}{\rho C_D}}\sqrt{\frac{t}{L}}$$

where $\gamma$ is the density of the material, $\rho$ is the density of air, $C_D$ is the drag coefficient of the shape through air, and t/L is the ratio of sheet thickness to a characteristic length dimension of the sheet. For a rectangular sheet perpendicular to the flow direction, the drag coefficient can be found on the internet to be about 2. The density of a typical paper sheet and the density of air are also readily available on the internet. Accordingly the foregoing equation can be solved to show that a threshold length-to-thickness ratio, L/t, of about 1200 would correspond to the transition between fluttering and tumbling for paper in air—higher L/t values suggesting flutter motion and lower L/t values suggesting tumbling motion.

For artifacts having different major and minor dimensions, the transition between tumbling and fluttering may require that Froude numbers based on both the major dimension and the minor dimension need to exceed that threshold length-to-thickness ratio—i.e., the major-dimension-to-thickness ratio and the minor-dimension-to-thickness ratio both should exceed about 1200 for flutter motion. Accordingly, for an application where fluttering motion is desired, the artifact should be designed such that the ratio of major-dimension-to-thickness and the ratio of minor-dimension-to-thickness both exceed about 1200. Where primarily tumbling motion is preferred, at least one of those ratios should be less than about 1200.

Figure 10:
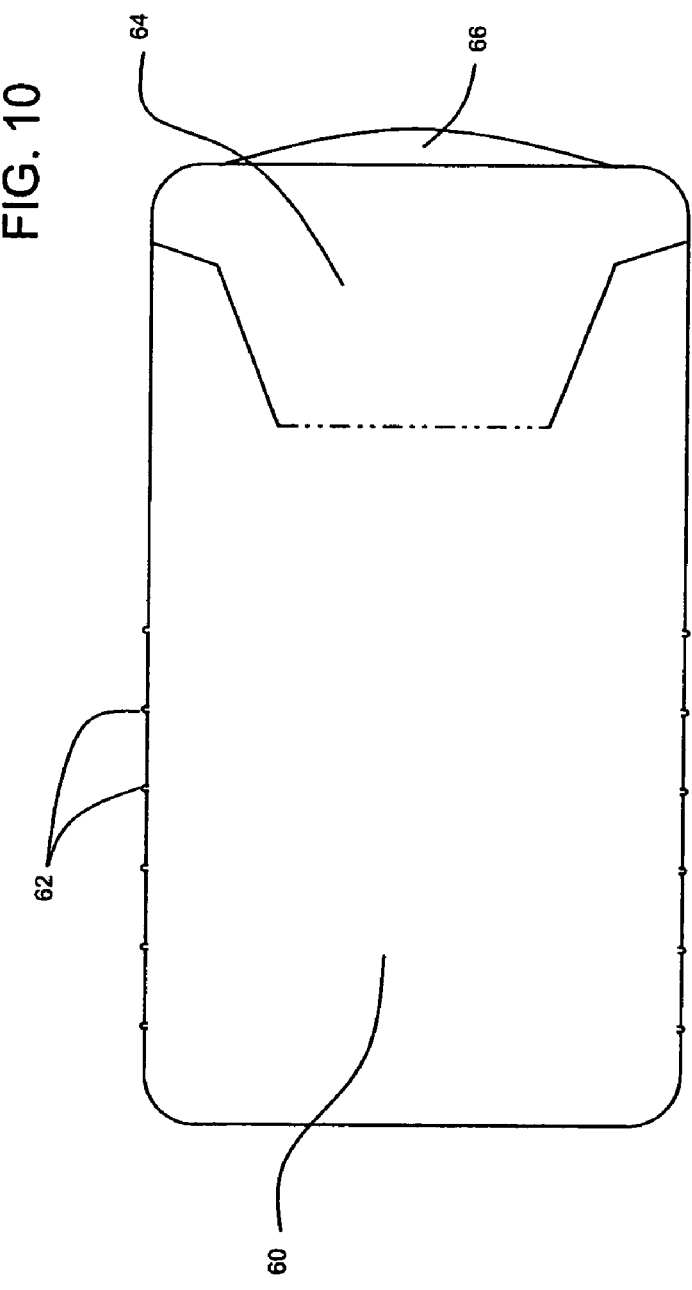
FIG. 10 is an isometric view of a package for use and display of multiple artifacts of the invention.

The artifacts 20 of this invention may be merchandised in any desired manner. However, one presently preferred package (see FIG. 10) may comprise a hollow container 60 which is generally rectangular in plan view with generally rounded corners and a plurality of outwardly extending side protrusions 62. The package preferably has a length and width exceeding the major and minor dimensions, respectively, of the artifacts to be packaged therein. Preferably, a plurality of similarly shaped artifacts will be stacked inside the package 60. The protrusions 62 aid the consumer's grip on the package.

At one end of the package, an openable flap 64 may be provided with a width corresponding to the width of the package so that artifacts inside the container can be removed one at a time. Preferably, the flap 64 also extends from one end of the package so that a consumer can access a portion of the uppermost artifact in the stack. A lift tab 66 may be provided on the flap 64 to facilitate lifting the tab 64 so that is folds along a hinge line 68 at the end opposite the tab 66.

The artifact 20 (e.g., FIG. 1) can be used to promote interaction between a human and feline pet. For example, a package 60 (FIG. 10) of artifacts may be provided. The artifacts of the package 60 are preferably designed to generate erratic motion when they fall through a gravitational field and aerodynamically interact with air during the fall. More particularly, the artifact may be designed to generate erratic motion which may include one or more of fluttering motion, tumbling motion, and/or autorotation motion as the artifact falls. In addition at the time of manufacture, the artifact may be given a coating having one or more ingredients selected from the group consisting of palatants, flavorants, and nutraceuticals.

The flap 64 may be opened by lifting the tab 66 to expose a stack of artifacts inside the package. Then, one of the artifacts may be removed from the package 60 and the flap 74 is closed to maintain freshness of the remaining artifacts in the package 60.

The selected artifact 20 (e.g., FIG. 1) may then be dropped or released from height sufficient for the designed erratic motion to develop as the selected artifact interacts with air during its fall. To promote interaction between the human and the feline pet, the dropping step should take place in proximity to the feline pet. That concept of proximity is elastic. When the feline pet first experiences a falling artifact according to this invention, the artifact may need to be near the feline. On the other hand, when the cat has enjoyed multiple interactions with these artifacts, then the cat may become aware of the erratically moving airborne object as long as it is, for example, in the same room.

Usually, the feline pet is allowed to chase, jump at, and/or catch the falling artifact.

To enhance the feline pet's interest in the artifact, the artifact may be coated with a conventional palatant or flavoring. Such palatants and flavorings may convert the falling artifact into a desirable treat or toy. Repeated dropping of these artifacts provides periods of time where the feline pet and its human handler spend time together playing with objects of common interest—the feline pet playfully chasing, jumping at, and catching the artifact, while the human handler raises and drops erratically moving artifacts for the pet's amusement. In this connection, that interaction between the caregiver and the feline pet may also be effective to promote exercise for the feline pet, thereby enhancing its physical condition and well-being.

Figure 9:
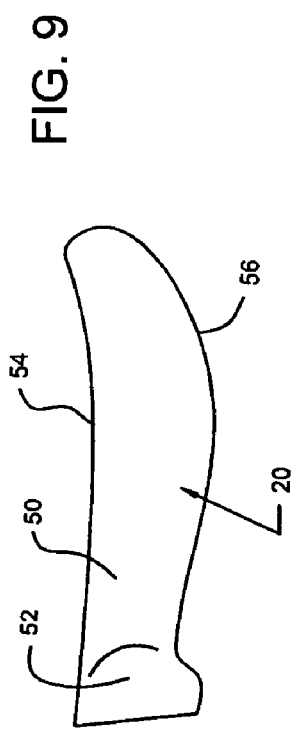
FIG. 9 is a plan view of an artifact according to a ninth embodiment of the invention.

These artifacts may also function as a delivery system for nutraceuticals. The nutraceutical may be an ingredient of a coating or an ingredient of the substrate of the artifact. In such arrangements, the nutraceutical may be provided as part of the artifact at the time of manufacture. On the other hand, when an artifact such as the embodiment of FIG. 9 is used, the nutraceutical may be placed in the pocket of the bulbous area 52 by the human handler before the artifact is dropped to the pet. In this way, the nutraceutical can be delivered to the feline pet in a playful manner. Such an arrangement may be particularly useful when the feline pet has become accustomed to playful interaction with artifacts according to this invention and it then becomes necessary to deliver a nutraceutical to the pet.

In this specification, when the word "about" or "substantially" is used in connection with numerical values, applicants intend that such numerical values include a tolerance of ±10% to reach substantially equivalent values.

Various embodiments of a novel and nonobvious airborne interactive cat treat or toy and a method of using it have been described above in detail. Nevertheless, it will be apparent to those skilled in the art that numerous modifications, variations, substitutions and equivalents exist for various features and elements of the product and method. Accordingly, it is expressly intended that all such modifications, variations, substitutions and equivalents which fall within the spirit and scope of the appended claims be embraced thereby.

What is claimed is:

1. An artifact adapted for interaction with a pet, comprising:
    an article, having a major dimension, a minor dimension, and a thickness, where the minor dimension is less than the major dimension, the thickness is substantially less than the major dimension, and further comprising a substance containing at least one of a feline palatant, flavorant, or nutraceutical;
    wherein the article is aerodynamically interactive under gravitational forces during free fall through air when dropped from a predetermined height.

2. The artifact of claim 1, wherein the aerodynamic interactivity is flutter.

3. The artifact of claim 1, wherein the aerodynamic interactivity is tumble.

4. The artifact of claim 1, wherein the aerodynamic interactivity is autorotation.

5. The artifact of claim 1, wherein the aerodynamic interactivity is erratic motion.

6. The artifact of claim 1, wherein the aerodynamic interactivity is at least one of flutter, tumble, and autorotation.

7. The artifact of claim 1, wherein the article includes a nutraceutical.

8. The artifact of claim 1, wherein the article is film-like.

9. The artifact of claim 1, wherein the article is dissolvable in pet saliva.

10. The artifact of claim 1, wherein the major dimension and the minor dimension are proportioned such that the article has a generally rectangular shape.

11. The artifact of claim 1, wherein the major dimension and the minor dimension are proportioned such that the article resemble a narrow strip.

12. The artifact of claim 1, wherein the article resembles a butterfly.

13. The artifact of claim 1, wherein the article resembles a bird.

14. The artifact of claim 1, wherein the article provides an olfactory sensation to a pet.

15. The artifact of claim 1, wherein the article comprises a cat treat.

16. The artifact of claim 1, wherein the article comprises a cat toy.

17. The artifact of claim 1, wherein the major dimension and the minor dimension are related such that the Froude number for both the major dimension and the minor dimension is less than about 0.67.

18. The artifact of claim 1, wherein the major dimension and the minor dimension are related such that the Froude number for one of the major dimension and the minor dimension is greater than about 0.67.

19. The artifact of claim 1, wherein the ratio of major dimension to thickness and the ratio of minor dimension to thickness each exceeds about 1200.

20. The artifact of claim 1, wherein either the ratio of major dimension to thickness or the ratio of minor dimension to thickness is less than about 1200.

21. The artifact of claim 1, wherein the article is a thin generally flat film.

22. The artifact of claim 1, wherein the article is a thin curved film.

23. The artifact of claim 1, wherein the article is a thin wavy film.

24. An artifact adapted for interaction with a pet, comprising:
    an article, having a major dimension, a minor dimension, and a thickness, where the minor dimension is less than the major dimension, the thickness is substantially less than the major dimension, and further comprising a substance containing at least one of a feline palatant, flavorant, or nutraceutical;
    wherein the article is aerodynamically interactive under gravitational forces during free fall through air when dropped from a predetermined height; and
    wherein the aerodynamic interactivity is at least one of tumble, flutter, and autorotation.

25. An artifact adapted for interaction with a pet, comprising:
    an article, having a major dimension, a minor dimension, and a thickness, where the minor dimension is less than the major dimension, the thickness is substantially less than the major dimension, and further comprising a substance containing at least one of a feline palatant, flavorant, or nutraceutical;
    wherein the article is aerodynamically interactive under gravitational forces during free fall through air when dropped from a predetermined height; and
    wherein the major dimension and the minor dimension are related such that the Froude number for one of the major dimension and the minor dimension is greater than about 0.67.

* * * * *